US007198513B2

(12) United States Patent
Marchese

(10) Patent No.: US 7,198,513 B2
(45) Date of Patent: *Apr. 3, 2007

(54) CEILING MOUNT ELECTRICAL FIXTURE

(76) Inventor: Christopher L. Marchese, 4536 Pale Moss Dr., Raleigh, NC (US) 27606

( * ) Notice: Subject to any disclaimer, the term of this patent is extended or adjusted under 35 U.S.C. 154(b) by 0 days.

This patent is subject to a terminal disclaimer.

(21) Appl. No.: 11/481,470

(22) Filed: Jul. 6, 2006

(65) Prior Publication Data
US 2006/0252303 A1 Nov. 9, 2006

Related U.S. Application Data

(63) Continuation-in-part of application No. 11/068,289, filed on Feb. 28, 2005, now Pat. No. 7,081,007.

(51) Int. Cl.
*H01R 13/72* (2006.01)
(52) U.S. Cl. ............... 439/501; 439/531; 439/537; 362/387
(58) Field of Classification Search ........ 439/501, 439/531, 537; 362/387
See application file for complete search history.

(56) References Cited

U.S. PATENT DOCUMENTS

| 1,730,104 | A | 10/1929 | Wheat |
| 2,521,226 | A | 9/1950 | Keller |
| 2,774,048 | A | 12/1956 | Baenziger |
| 3,340,392 | A | 9/1967 | Fehler et al. |
| 3,584,213 | A | 6/1971 | Meltzer |
| 3,999,640 | A | 12/1976 | Persson |
| 4,511,198 | A | 4/1985 | Mitchell et al. |
| 4,816,969 | A | 3/1989 | Miller |
| 5,003,450 | A | 3/1991 | Burton et al. |
| 5,418,701 | A | 5/1995 | Hart |
| 5,490,051 | A | 2/1996 | Messana |
| 5,535,960 | A | 7/1996 | Skowronski et al. |
| 5,629,826 | A | 5/1997 | Roca et al. |
| 5,658,074 | A * | 8/1997 | Guritz ................. 362/396 |
| 5,723,815 | A | 3/1998 | Pena |
| 6,019,481 | A | 2/2000 | Ambach et al. |
| 6,142,824 | A | 11/2000 | Savoca et al. |
| 6,161,943 | A | 12/2000 | Chang |
| 6,234,812 | B1 | 5/2001 | Ivers et al. |
| 6,428,181 | B1 | 8/2002 | Moriarty |
| RE38,211 | E | 8/2003 | Peterson et al. |
| 6,616,080 | B1 | 9/2003 | Edwards et al. |
| 6,648,677 | B1 | 11/2003 | Boyd |
| 6,669,135 | B1 | 12/2003 | Hartley |
| 7,040,784 | B2 * | 5/2006 | Yen ..................... 362/405 |
| 7,052,281 | B1 * | 5/2006 | Meyberg et al. ........ 439/4 |

* cited by examiner

*Primary Examiner*—Gary F. Paumen
(74) *Attorney, Agent, or Firm*—Miller Patent Services; Jerry A. Miller

(57) ABSTRACT

An electrical fixture consistent with certain embodiments has a light fixture and a mount used to attach the light fixture to a ceiling. An electrical outlet is electrically connected to a source of line voltage by an electrical cable. A retraction mechanism, dispenses and retracts the electrical cable, so that the electrical outlet can be moved between a retracted position adjacent the light fixture with the electrical cable fully retracted and at least one extended position wherein at least a portion of the electrical cable is dispensed from the retraction mechanism. This abstract is not to be considered limiting, since other embodiments may deviate from the features described in this abstract.

29 Claims, 8 Drawing Sheets

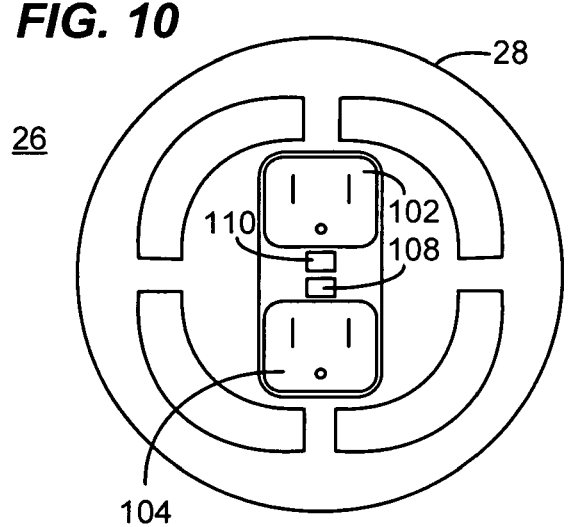
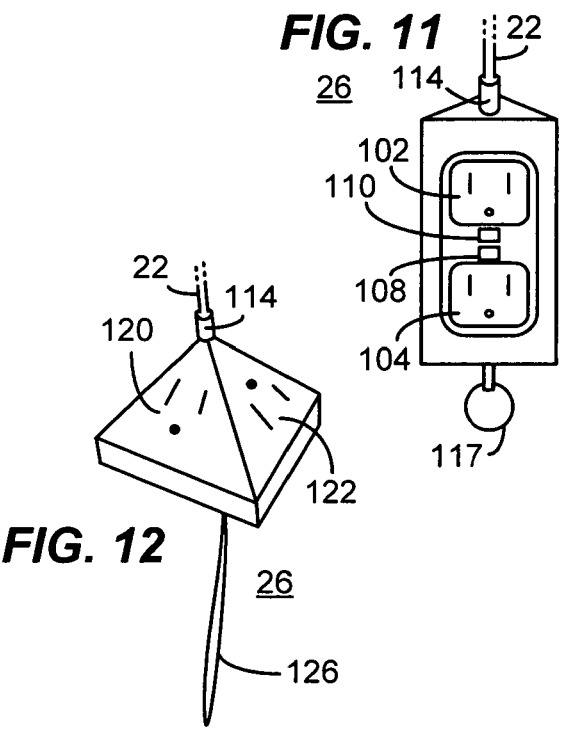
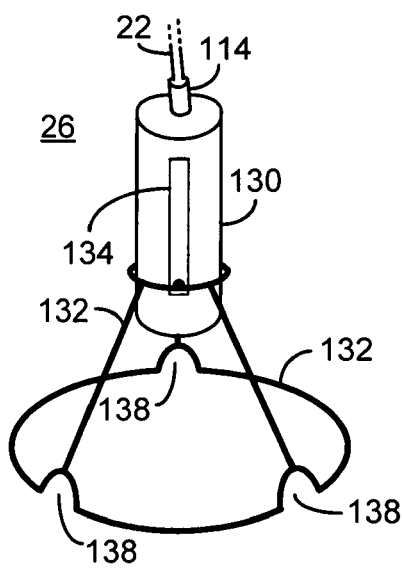
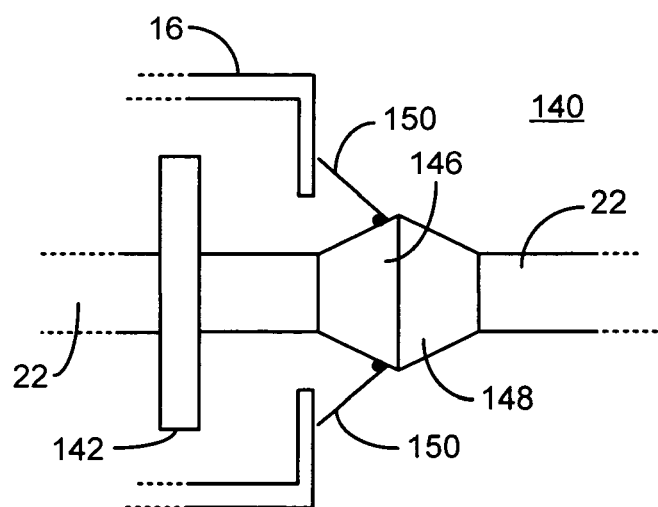

CEILING MOUNT ELECTRICAL FIXTURE

CROSS REFERENCE TO RELATED DOCUMENTS

This application is a continuation-in-part of U.S. application Ser. No. 11/068,289 filed Feb. 28, 2005, now U.S. Pat. No. 7,081,007, issued Jul. 25, 2006 which is hereby incorporated by reference.

BACKGROUND

Recently, people have become more and more dependent upon battery-powered devices in their business and personal lives. Such devices as wireless telephones, digital cameras, personal digital assistants and laptop or notebook computers have increasingly become pervasive in many people's lives.

Society has also become quite mobile with business and personal transactions often taking place in coffee shops, bars, lounges, airport and social clubs, Internet cafés and other locations—particularly locations supporting Internet "hot spots". This has promoted further convenience and growth in the use wireless devices.

Frequently, such battery powered devices are powered by NiMH or NiCad batteries or other battery technologies which require periodic recharging. For people working outside a traditional office setting, this frequently means carrying extra batteries and charging devices to assure that they always have enough power to carry out their normal business activities. This can be inconvenient; so many people opt to make regular stops at coffee shops or the like to take advantage of recharging opportunities. It is common to see travelers sitting on the floor at an airport to take advantage of one of only a few electrical outlets available to recharge batteries of a wireless telephone or notebook computer.

Unfortunately, heretofore, it has often been difficult to secure a seat at a busy coffee shop or other location adjacent a wall with an electrical outlet. Such seats—particularly at an Internet hot spot or Internet café are frequently the first to be taken due to the availability of outlet access. Since many buildings housing such establishments were built long before anyone envisioned the need to provide power outlets to patrons, retrofitting the establishment to make more such outlets available can be expensive. Moreover, for tables situated in an open floor area without an adjacent wall, the task is often impossible or prohibitively expensive.

BRIEF DESCRIPTION OF THE DRAWINGS

Certain illustrative embodiments showing organization and method of operation, together with objects and advantages may be best understood by reference detailed description that follows taken in conjunction with the accompanying drawings in which:

FIG. 10 is an alternate view of the outlet side of the outlet assembly 26 of FIG. 3 consistent with certain embodiments of the present invention having a dual outlet with integral ground fault interruption circuit.

FIG. 11 is an alternate embodiment of outlet assembly 26 consistent with certain embodiments of the present invention.

FIG. 12 is another alternate embodiment of outlet assembly 26 consistent with certain embodiments of the present invention.

FIG. 13 is yet another alternate embodiment of outlet assembly 26 consistent with certain embodiments of the present invention.

FIG. 14 is an exemplary embodiment of a breakaway connector consistent with certain embodiments of the present invention.

DETAILED DESCRIPTION

Figure 1:
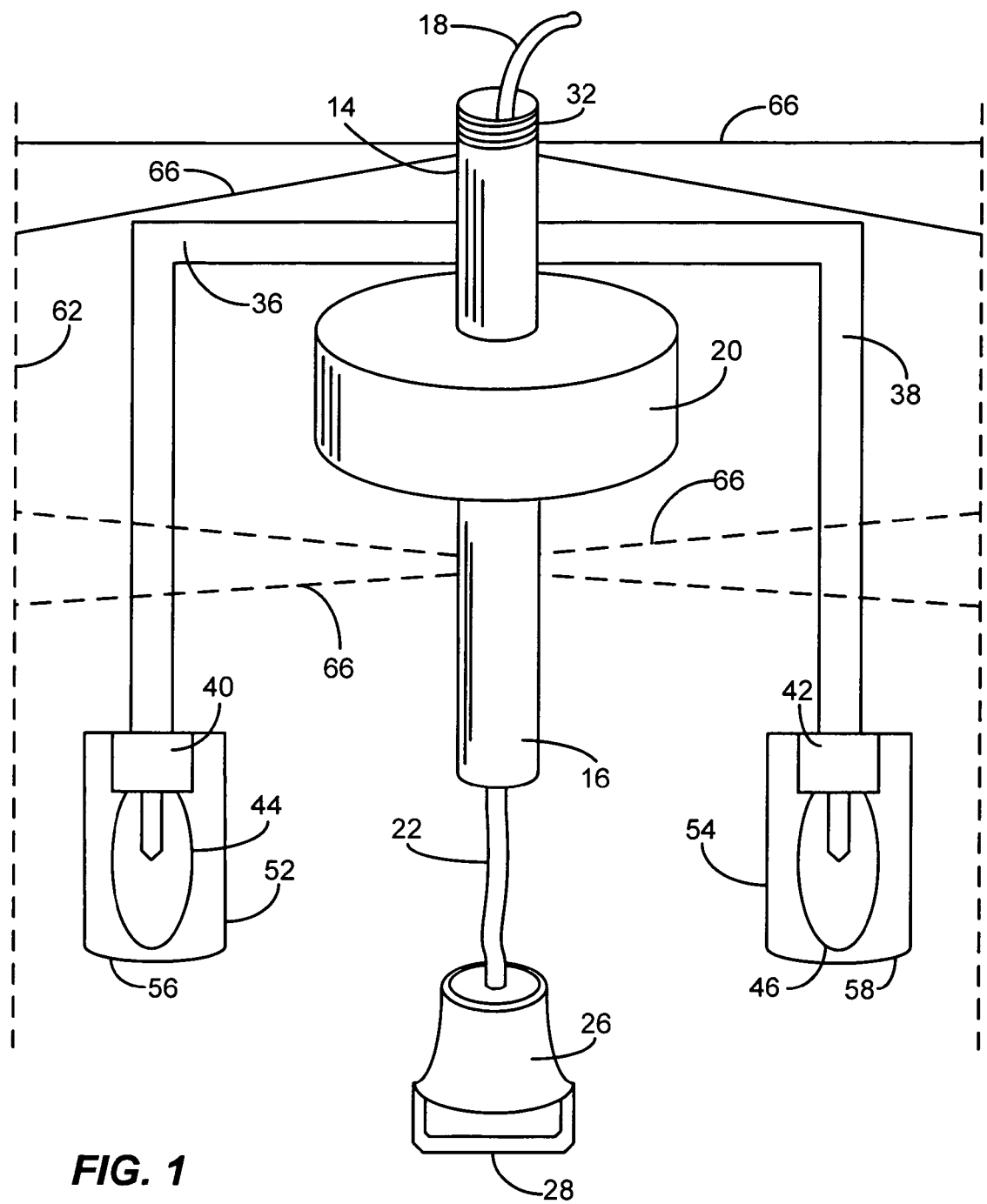
FIG. 1 is a view of a ceiling mountable light fixture with an extensible and retractable electrical outlet consistent with certain embodiments of the present invention, and showing an electrical outlet assembly in a partially extended position.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "retraction mechanism" is used herein to refer to any mechanism used to retract and dispense electrical cable as will be described in detail later, and thus, a dispensing function is implied by use of the term. The term "handle" as used herein means any handle, knob, lever, tether, lanyard, ring, pull, chain, housing opening, or other feature that permits one to easily grasp an outlet assembly.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation. The term "ceiling" as used herein means any covering situated above an open or closed area such as a room or patio; or, any structure (open or closed) that suspends the light fixture described herein overhead.

In certain embodiments consistent with the present invention, a ceiling mounted lighting fixture, such as for example a pendant style light fixture, is adapted to provide a retractable or extensible electrical outlet for use by customers in a business establishment, visitor to a public facility (e.g., a library) or by a home user wishing to provide power using the embodiments consistent with the present invention.

Turning now to FIG. 1, a first embodiment of a ceiling mountable pendant light fixture with a retractable electrical outlet, consistent with certain embodiments of the present invention is depicted. In this embodiment, a tubular main body member has an upper segment 14 and a lower segment 16. The body member segment 14 is hollow to permit wiring such as 18 to pass therethrough and connect to a cable retraction mechanism 20.

Cable retraction mechanism 20 incorporates, for example in one embodiment, a spring loaded spool that carries cable 22 and a mechanism for securing the cable at any one of several (at least one) extended positions. In the present illustration, the cable 22 is shown partially extended from the retraction mechanism and passing through lower segment 16. The lower end of cable 22 is attached to an outlet assembly 26 which, in the present embodiment, incorporates a handle 28 (see definition above) to enable the user to easily grasp the outlet assembly 26 to facilitate dispensing the cable 22 from or retracting the cable 22 into the retraction mechanism 20.

The retraction mechanism 20 may take many forms in various embodiments consistent with embodiments of the present invention. For example, reel type retraction mechanisms, spring driven mechanisms, automatically locking retraction mechanisms, elastic wrapping mechanism, manually locking retraction mechanisms, motor driven retraction mechanisms, manually operated reels, ratcheting mechanisms or, in short, any mechanism that dispenses and retracts a length of electrical cable under user control, without limitation. In certain embodiments, the retraction mechanism 20 can be designed to operate in much the same manner as reel type retraction mechanisms used in mechanic shops where overhead hoses carrying air, oil or other fluids, and work light cables are stored in reels that can be retrieved by the user pulling the end to the desired length. The hose or cable then locks in place at that length until the user again pulls the hose or cable to unlock the cable or hose, at which point a spring mechanism retracts the cable to a position above the user's head and out of the way (i.e., a tug and release mechanism).

In other embodiments, a retraction mechanism 20 can use a simple spring loaded reel in which the user extends the cable 22 to the desired length and then manually locks the cable at the desired length. The user can then manually unlock the cable to retract it to the fully retracted and out of the way position. In yet a third embodiment, the retraction mechanism 20 can operate in much the same manner as the retraction mechanism depicted in U.S. Pat. No. 3,999,640 to Persson, which is hereby incorporated by reference in its entirety, in which the cable 22 can be pulled out to the desired length where it automatically locks in place until released by a manual release mechanism. Other embodiments are also consistent with the present invention, even including those incorporating damping mechanisms to slow the movement of the cable and those using servo motors or other motors to dispense and retract the cable 22. In short, any suitable mechanism that dispenses and retracts the cable 22 can be adapted to be incorporated within embodiments consistent with the present invention.

While the present mechanism can be adapted to many lighting fixtures, a simple pendant style fixture is illustrated which can be readily attached using many known mechanisms to any ceiling structure. In the example shown, the upper end of upper support 14 is shown to carry male threads 32 that can be screwed into a support mechanism such as that often used to hang ceiling fans. Once screwed into a suitable support mechanism, a set screw, pin or other device can be used to prevent unthreading of the threaded connection. In this manner the light fixture and retraction mechanism is ultimately, albeit in some embodiments not directly, coupled to the mount via upper segment 14. In other embodiments, other mounts suitable for track, pendant light or other ceiling mounting mechanisms for mounting the light fixture to a ceiling can be used without limitation.

In this embodiment, a pair of tubular sections 36 and 38 is coupled to the upper segment 14 in any suitable manner (e.g., welds, adhesives, solder, or molded as a single or multiple part structure) and terminates in lamp sockets 40 and 42 to carry conventional incandescent lamps 44 and 46. Tubular sections 36 and 38 are hollow to carry electrical wiring to the lamp sockets.

The lamp sockets 40 and 42 may also carry bulb covers 52 and 54 that serve to reflect light downward and/or reduce likelihood of a user burning his or her hand and/or breaking a bulb while retracting the outlet assembly 26. (In the case of high intensity LED lamps or other low temperature light sources, or other arrangements where the handle is a suitable distance from the lamps, covers may be omitted.) The covers may also incorporate lenses 56 and 58. While a pair of incandescent bulbs is shown, numerous other functional and ornamental arrangements of light can be used without departing from embodiments consistent with the present invention. By way of example and not limitation, standard household electrical voltage rated light fixtures can be used, as well as high intensity LEDs, halogen sources, low voltage light fixtures, low temperature lights, high intensity lights, fluorescent lights or any other electrically generated source of light can suitably be used without departing from the invention. The structures associated with carrying light producing devices are referred to herein as a light fixture.

A lamp shade 62 such as a tubular or oval style shade may be used in certain embodiments to surround the overall assembly. The lamp shade 62 can be supported in any suitable manner such as support members 66. However, it is noted that a lamp shade, per se, is not required, and in fact may be specifically omitted in order to facilitate certain ornamental designs.

Figure 2:
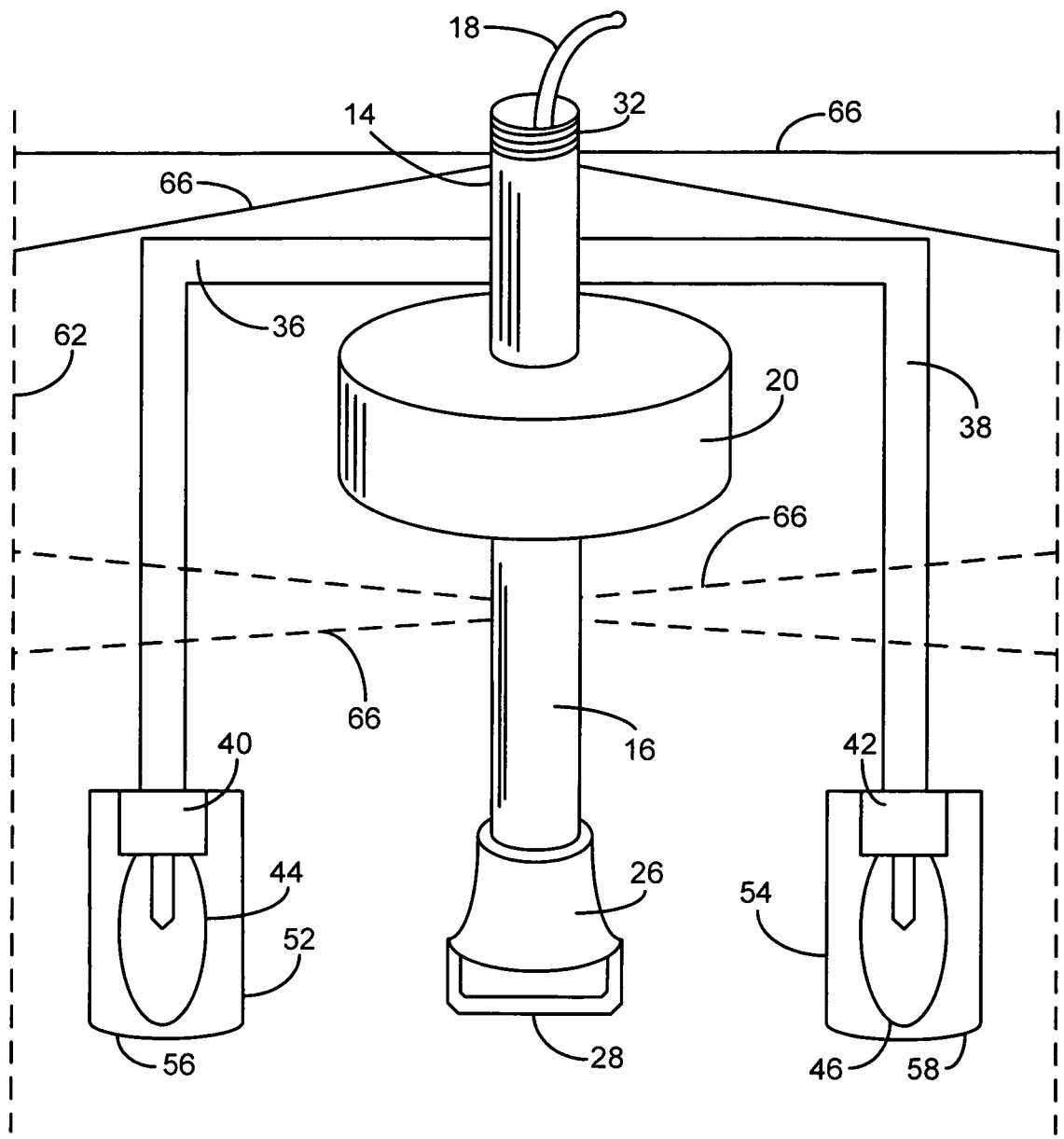
FIG. 2 is a view of the ceiling mountable light fixture with an extensible and retractable electrical outlet consistent with certain embodiments of the present invention as shown in FIG. 1, and showing the electrical outlet assembly in a retracted position.

Referring to FIG. 2, the embodiment of a ceiling mountable pendant light fixture with a retractable electrical outlet as shown in FIG. 1 is illustrated in with the outlet assembly 26 in the fully retracted position. The outlet assembly 26 may be held in this position by spring tension, locking mechanisms, magnetic or mechanical catches or any other suitable expedient. In certain embodiments, as will be described later, a quick release or breakaway mechanism may be provided to permit the cable 22 and outlet assembly 26 to detach from the light fixture, for example in the case of accidental overextension of the cable 22.

Thus, an electrical fixture consistent with certain embodiments has a light fixture and a mounting mechanism for mounting the light fixture to a ceiling. An electrical outlet is electrically connected to a source of line voltage by an electrical cable. A dispensing and retracting means is configured to dispense and retract the electrical cable, so that the electrical outlet can be moved between a retracted position adjacent the light fixture with the electrical cable fully retracted and at least one extended position wherein at least a portion of the electrical cable is dispensed from the dispensing and retracting means.

Figure 3:
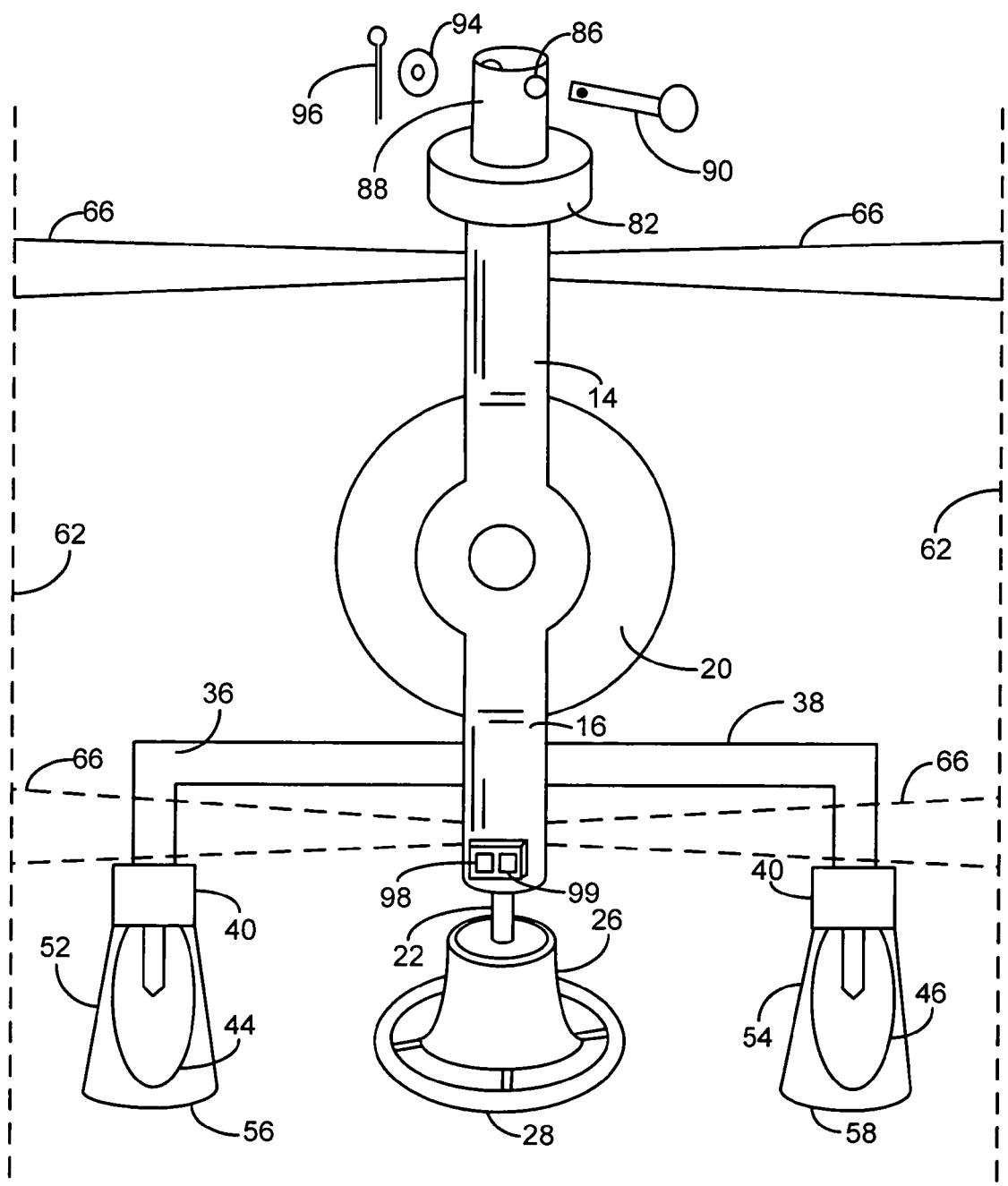
FIG. 3 is a second embodiment of a ceiling mountable light fixture with an extensible and retractable electrical outlet consistent with certain embodiments of the present invention.

FIG. 3 depicts another embodiment of a ceiling mountable pendant light fixture with a retractable electrical outlet in which the retraction mechanism 20 is mounted with a vertical orientation as opposed to the prior embodiment in which the retraction mechanism 20 was mounted in a horizontal orientation. FIG. 3 may be best understood by reference to the associated FIG. 4 which depicts a side view of the central portion including retraction mechanism 20 of the assembly. In each case, like reference numbers are often used to reference functionally equivalent portions of the two assemblies despite design differences. In this embodiment, the vertical orientation of the retraction mechanism 20 permits cable 22 to be readily taken from an internal reel (not shown) at the outer side of the reel, whereas, depending upon the design, the horizontal orientation may be used to take cable from either the outside or inside of an internal reel depending upon the design.

In the present embodiment, the light fixture's tubular sections 36 and 38 are coupled to the lower segment 16 rather than the upper segment 14 as in the previous embodiment. Any suitable location and mechanism for mounting the light fixtures can be used without limitation. However, in this embodiment, getting power to the lights is somewhat more complicated than in the prior embodiment.

Figure 4:
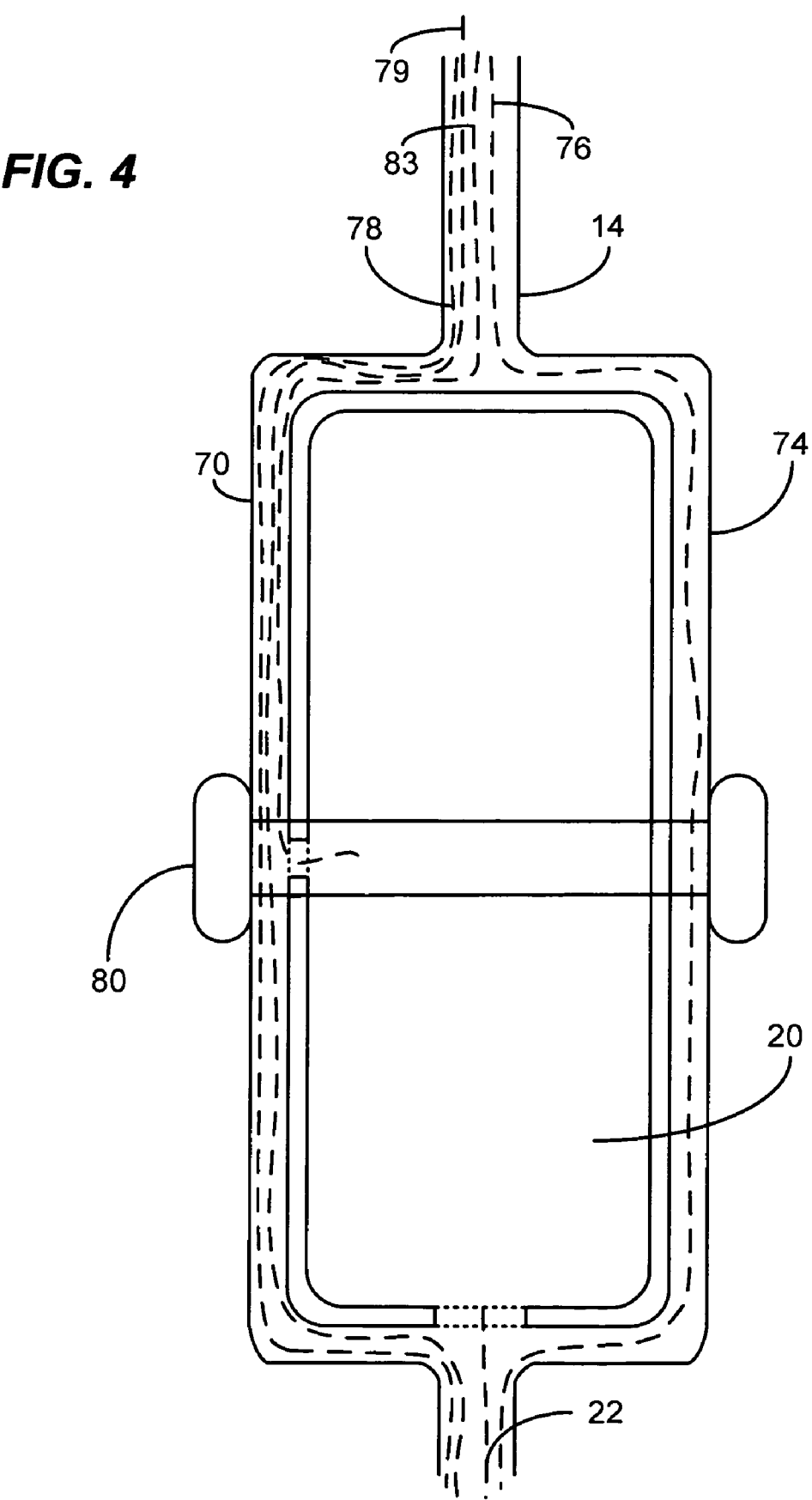
FIG. 4 is a side view of the retraction and extension assembly of the embodiment shown in FIG. 3 consistent with certain embodiments of the present invention.

As seen more clearly in FIG. 4, the tubular main body member starts out at the upper segment 14 and then splits into two channels 70 and 74 before rejoining at lower segment 16. This advantageously permits wiring 76 for the lighting to pass through the right split 74 (as illustrated), while wiring for the retraction mechanism and the outlet assembly to pass through the left split 70. Both sets of wires merge into the lower segment 16. In the event the lighting and outlet are powered by two different voltages (e.g., if low voltage lighting or LED lights are used), appropriate separation and insulation can be added between the two sets of wiring when enclosed in the upper and lower segments for safety. This can be accomplished with insulating sleeves and/or partitions or the like.

In the example illustrated in FIG. 3-4, a Ground Fault Interruption Circuit (GFIC) is incorporated into a housing 82, but test and reset buttons 98 and 99 are more conveniently positioned on lower segment 16. Thus, wiring 78 extends from the top of segment 14, through split 70 down to lower segment 16 and returns as wiring 79 from the switches to the GFIC circuit housed in housing 82. Wiring 83 then passes downward through upper segment 14 to the center entrance to retraction mechanism 20.

The retraction mechanism 20 is mounted at a central point using an axle structure 80 that permits rotation of an internal reel, but locks the housing in place using a key or the like.

Other variations will occur to those skilled in the art upon consideration of the present teachings.

Referring back to FIG. 3, several other variations are shown between this embodiment and that of FIGS. 1–2. The outlet assembly utilizes a handle 28 resembling a steering wheel surrounding the outlet assembly 26. Using this configuration, devices that use transformers with prongs that plug directly into the outlet can be easily accommodated. The upper portion of the main body member incorporates housing 82 of any suitable shape and size which is either integral or attached to segment 14. In other embodiments housing 82 can be attached to segment 16 or the retraction mechanism 20 or the ceiling or the ceiling mount. This housing 82 can be used to carry a variety of electronics, such as for example, a circuit breaker, a ground fault interrupter, uninterruptible power source, a low voltage lighting transformer, a fluorescent starter or transformer, a surge arrester, or an LED drive circuit. Access to the inside of the housing can be provided by an access door (not shown) or by separation of the housing into multiple component parts, or by any other suitable expedient. Certain of such circuitry might also be situated inside the outlet assembly 26 or mounted elsewhere on the light fixture.

It is contemplated that one of the main uses of such a light fixture is to provide electrical power to charge computers, telephones and the like in cafés or other public places. As such, the electrical outlet should preferably, but not necessarily, be protected with a ground fault interrupter circuit (GFIC) which can be housed either in housing 82 as described or alternately in outlet assembly 26 (either of which may be considered a housing for purposes of this discussion). This will protect a user from shock, should coffee or other beverages be accidentally spilled on the outlet or an electronic appliance plugged into the appliance.

FIG. 3 also depicts an alternative of one of the many mount arrangements that can be used for attaching the lamp device to the ceiling. In this embodiment a pair of holes such as 86 are bored or otherwise formed in a top segment 88. A bolt or pin such as 90 passes through a supporting bracket or other support mechanism and also through holes 86. The pin is then secured in place with a washer 94 and cotter pin 96 in a known manner. Of course, any suitable mechanism known or devised can be used to affix the electrical fixture to a ceiling including screw connections, pins, brackets, clamping arrangements, hooks, bolts or any other mechanism that is suitable to the type of ceiling to which the fixture is attached can be used without limitation.

Thus, an electrical fixture consistent with certain embodiments has a light fixture and a mount used to attach the light fixture to a ceiling. An electrical outlet is electrically connected to a source of line voltage by an electrical cable. A retraction mechanism dispenses and retracts the electrical cable, so that the electrical outlet can be moved between a retracted position adjacent the light fixture with the electrical cable fully retracted and at least one extended position wherein at least a portion of the electrical cable is dispensed from the retraction mechanism.

Figure 5:
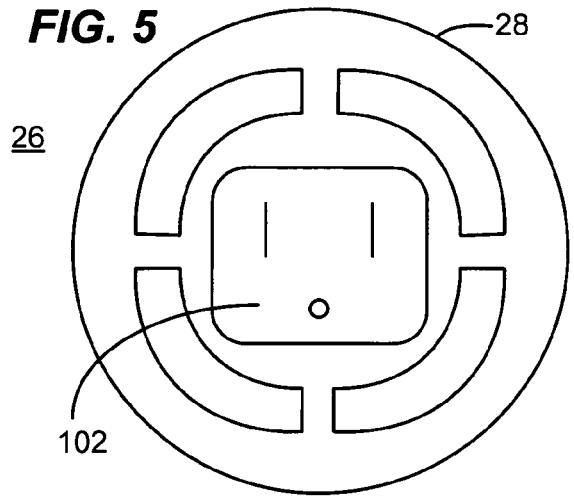
FIG. 5 is a view of the outlet side of the outlet assembly 26 of FIG. 3 consistent with certain embodiments of the present invention.

One embodiment of the outlet assembly shown in FIG. 3 is illustrated in greater detail in FIG. 5 which shows one example of the operative face of the outlet assembly 26 that normally faces downward when the outlet assembly 26 is in the fully retracted position. In this embodiment, the GFIC is housed in housing 82 as described with test and reset buttons mounted remotely. A conventional 115V grounded outlet 102 is provided, although other configurations, including but not limited to dual or other multiple outlet embodiments, can be used. The handle configurations shown should also not be considered limiting since any convenient arrangement that permits a user to grasp the outlet carrying portion of the structure is suitable—whether or not a separate handle structure, per se, is incorporated in the embodiment.

Figure 6:
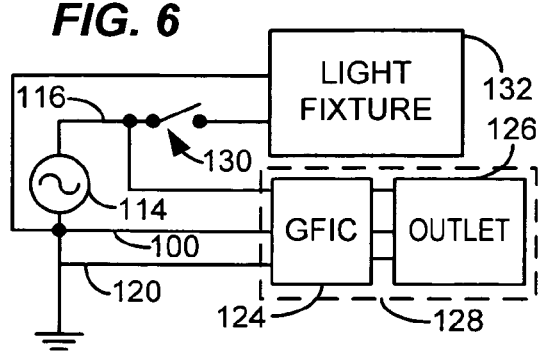
FIG. 6 is a schematic block diagram of a first embodiment consistent with the present invention.

FIG. 6 is a schematic diagram of a first embodiment consistent with the present invention in which a source 114 of single phase line voltage supplies a "hot" wire 116 and a "neutral" wire 118 which is generally redundant to a ground wire 120 carrying an earth ground connection. These three wires are connected through the retraction mechanism (not shown) to a GFIC circuit 124 which in turn supplies one or more outlets 126. In this illustration, the outlet 126 and the GFIC 124 are depicted as a combined device 128 which is commonly available commercially at electrical supply houses and hardware stores, but this arrangement should not be considered limiting. The hot wire 116 also passes through a switch 130 to supply light fixture 132. Switch 130 may be a conventional wall mounted light switch situated where it can be controlled either by a customer or by an establishment's proprietor. While not shown, it is understood that good practice involves grounding the light fixture and any metal parts thereof to protect the user from shock.

Figure 7:
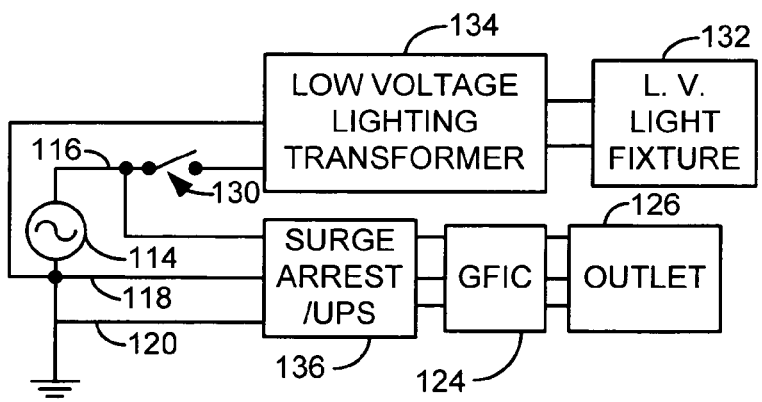
FIG. 7 is a schematic block diagram of a second embodiment consistent with the present invention.

A second embodiment of a suitable circuit diagram is shown in FIG. 7. In this embodiment, the light fixture 132 is a low voltage light fixture requiring transformer 134 to generate the appropriate voltage and current to drive the lights, but otherwise functions in a manner similar to that described above. Additionally, a surge arrester and/or an uninterruptible power source 136 can be provided to provide additional protection to the user of computing equipment.

Figure 8:
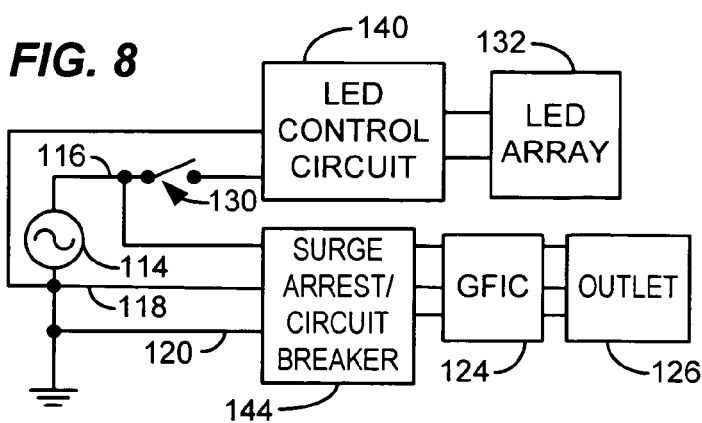
FIG. 8 is a schematic block diagram of a third embodiment consistent with the present invention.

A third embodiment of a suitable circuit diagram is shown in FIG. 8. In this embodiment, the light fixture 132 is a fixture suitable for carrying an array of high intensity LED lights. Accordingly, an LED control circuit 140 is used to generate the appropriate voltage and current to drive the LEDs, but otherwise the circuit functions in a manner similar to that described above. Additionally, a surge arrester and/or circuit breaker 144 can be provided to provide additional protection to the user of computing equipment.

Figure 9:
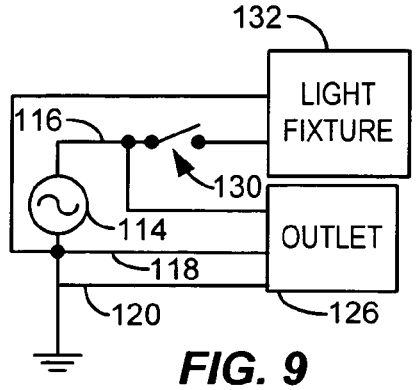
FIG. 9 is a schematic block diagram of a fourth embodiment consistent with the present invention.

A fourth and perhaps simplest embodiment of a suitable circuit diagram is shown in FIG. 9. In this embodiment, the light fixture 132 is a conventional incandescent lamp fixture and line power is supplied directly to the outlet 126. It is noted, however, that the power can be GFIC protected at the electrical panel or elsewhere if desired.

In each of the above embodiments, the various electronic components of the surge arrester, circuit breaker, GFIC, UPS, low voltage lighting transformer and LED control circuit can be mixed and matched and can be housed in a housing such as 82 or in any other convenient location. The GFIC, circuit breaker and surge arrester could equally well be disposed within the main housing of the outlet assembly. Additionally, although the circuit diagrams imply that both the outlet circuits and the lighting circuits are supplied from the same line source 114. This may be accomplished, however, through different circuit breaker protected circuits at the circuit panel so that a failure in power to the outlets does not interfere with lighting in a business establishment. Other variations will occur to those skilled in the art upon consideration of the present teachings.

A second embodiment of the outlet assembly shown in FIG. 3 is illustrated in greater detail in FIG. 10 which shows a second example of the operative face of the outlet assembly 26 that normally faces downward when the outlet assembly 26 is in the fully retracted position. In this embodiment, a GFIC is incorporated within the outlet, but this is not to be considered limiting since the GFIC, (if used) can also be housed elsewhere such as in housing 82 as previously described. A pair of U.S. conventional 115V grounded outlets 102 and 104 is shown, although other configurations, including but not limited to single outlet embodiments, can be used. The integral GFIC incorporates a test button 108 and a reset button 110 that operate in a conventional manner to test the GFIC and reset the GFIC once it is tripped. As previously noted, many other configurations of outlets and handles can be devised without departing from embodiments consistent with the present invention. The handle configurations shown should also not be considered limiting since any convenient arrangement that permits a user to grasp the outlet carrying portion of the structure is suitable—whether or not a separate handle structure, per se, is incorporated in the embodiment.

Other outlet assemblies can also be devised, without departing from the present invention. A third outlet assembly 26 is depicted in FIG. 11. In this embodiment, a triangular outlet assembly 26 is provided with outlets on one, two or all three of the three major surfaces thereof. The outlet assembly 26 is coupled with a strain relief 114 to cable 22. In this example, a simple ring 117 is attached to the bottom surface of the triangular housing assembly for use as a handle. A tether could also be tied to the ring 117 to serve as a handle. The surface shown has a GFIC integrated into the outlet, which can be used as the GFIC for outlets on other major surfaces thereof. In other embodiments, the GFIC, if used, can be situated elsewhere. Also, although shown as a triangular structure, four or more sides could also be used with outlets on at least one side thereof.

A fourth outlet assembly 26 is depicted in FIG. 12. In this embodiment, a pyramid shaped outlet assembly 26 is provided with outlets such as 120 and 122 (with the same or opposite orientation) on at least one of the multiple sides thereof. The outlet assembly 26 is coupled with a strain relief 114 to cable 22. In this example, a simple tether is attached to a ring, loop or catch provided at the lower surface of the outlet assembly to serve as a handle. The tether can be removed for cleaning or replaced as desired, and could carry logos or other advertising material thereon.

The above examples of outlet assemblies 26 are depicted as having either fixed handles, rings or tethers, but other embodiments may incorporate more elaborate handle structures. For example, FIG. 13 depicts a collapsible handle mechanism. Many such mechanisms may be devised in which the handle slides, rotates or can otherwise be positioned out of the way when the outlet is in use. In this embodiment, the outlet is contained in a cylindrical structure 130 with the outlet (not shown) appearing at the lower surface thereof. A cage 132 serves as a collapsible handle by virtue of a pin's movement in slot 134, permitting the cage 132 to slide up or down around the cylindrical structure 130. Several such pins and slots are provided around the periphery of the cylindrical structure 130 so that the structure 130 can drop down as needed to engage an electrical plug or transformer. The electrical plug or transformer wires can pass through the raised portions 138. The user can, thus, position a transformer with prong side facing up under the cylindrical structure 130 and engage the outlet. The cage 132 can be wire, plastic or any other suitable material as desired. Other embodiments of the outlet assembly 26 will occur to those skilled in the art upon consideration of the present teachings.

In the example illustrated in FIG. 13, as well as the other outlet assemblies, it is preferred that the outlet assemblies be small where possible. But where the handle such as cage 132 is designed to surround a transformer, it should, of course, be large enough to cover a reasonable sized transformer.

In order to provide for easy replacement of damaged cable 22 and outlet assemblies 26, as well as avoid damage to them, a breakaway mechanism 140 as shown in FIG. 14 can be provided to help assure that accidental over-extension of the cable 22 does not occur. In one embodiment, such a breakaway mechanism 140 can be situated at any desired position along cable 22, but preferably, close to the end of the extendable length of the cable. In such an embodiment, a stop 142 can be attached to the cable to prohibit further extension though the segment 16 or housing 20 (illustrated as segment 16). When the stop 142 reaches the opening through which cable 22 passes, it will not fit and thus blocks further extension of the cable. If adequate force is applied, a breakaway connector having parts 146 and 148 separates to prevent damage to the light fixture. When the breakaway connector (146+148) passes through the opening, spring arms 150 spring outward in a manner similar to that of a toggle bolt to prevent the cable 22 from retracting out of reach into the lower segment 16. Once the breakaway connector parts 146 and 148 are re-connected, the spring arms can be flexed out of the way so that the cable 22 can be retracted. Other breakaway mechanisms, if desired, can also be incorporated within embodiments consistent with the present invention.

Figure 15:
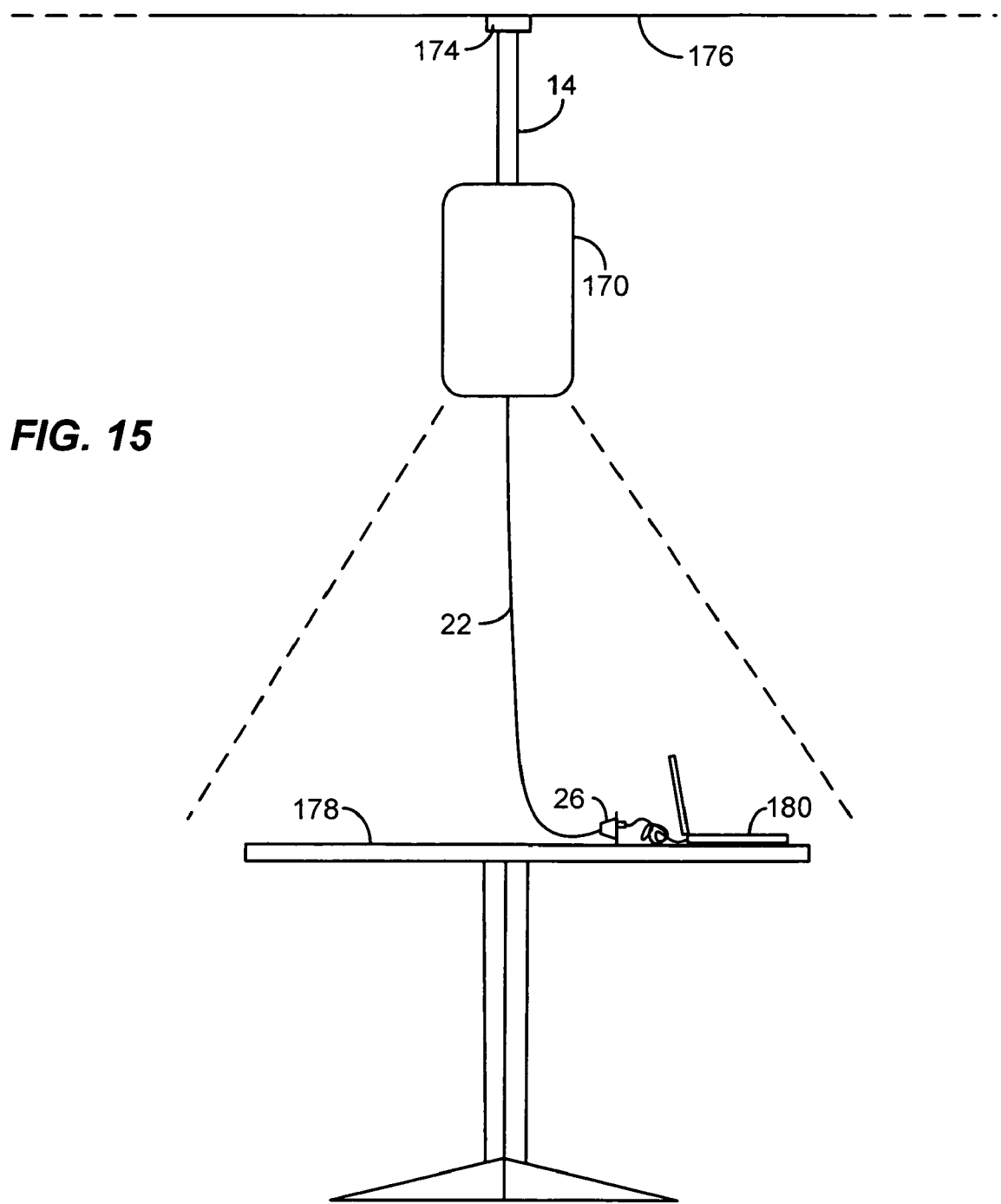
FIG. 15 is a view of a light fixture with an outlet assembly in an extended position consistent with certain embodiments of the present invention.

With reference to FIG. 15, the present lighting fixture is illustrated in use. The lighting fixture assembly 170 is suspended by an extended upper segment 14 to a bracket 174 or other mounting mechanism to the ceiling 176 over a table 178. The outlet assembly 26 is depicted with cable 22 dispensed to a suitable length to permit a notebook computer 180 to be plugged in to the outlet. When the customer is ready to leave, the retraction mechanism 20 is appropriately activated to retract cable 22 and outlet assembly back to a location within the fixture assembly 170 in a retracted position.

Figure 16:
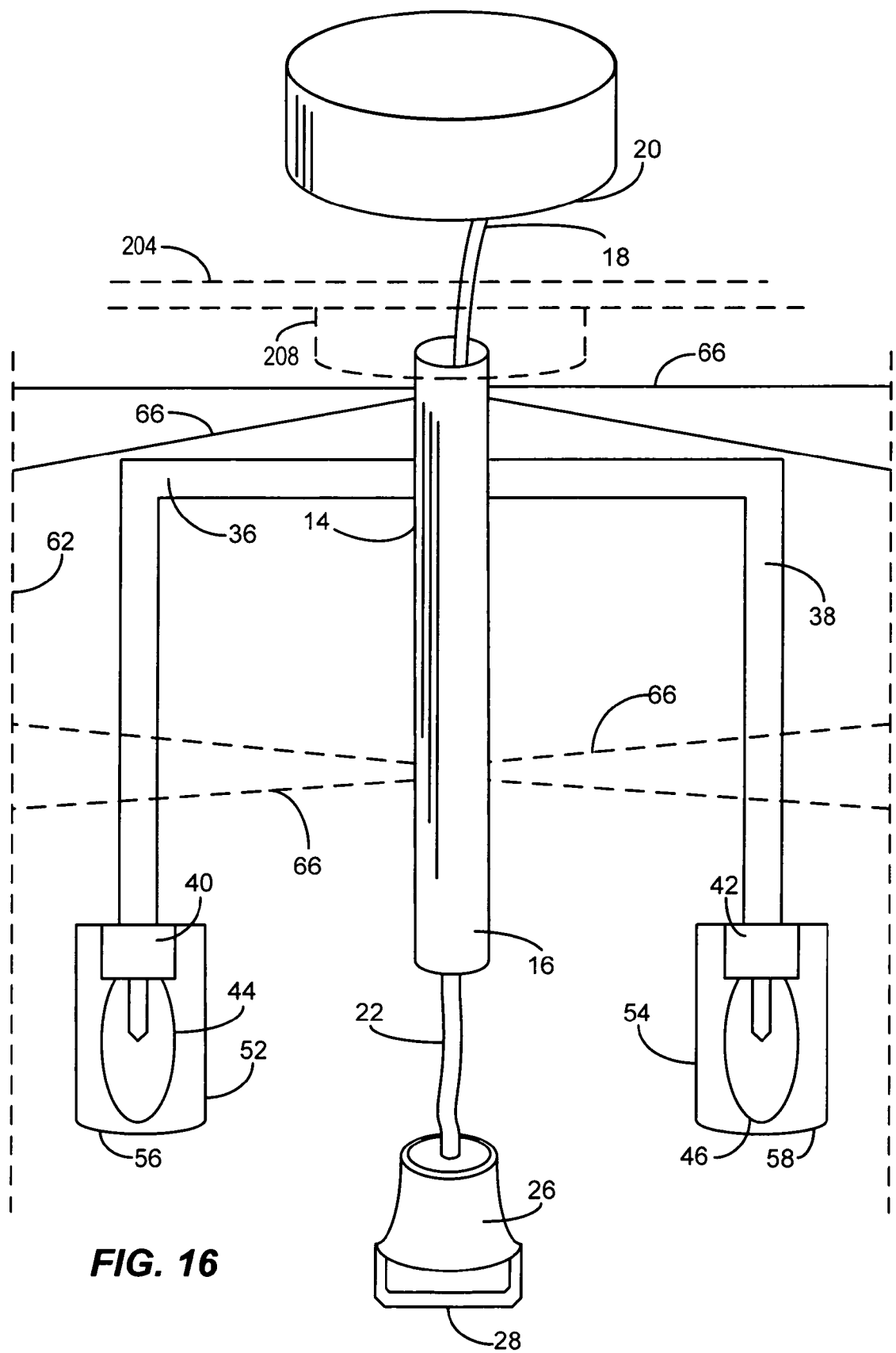
FIG. 16 is a view of another embodiment of a ceiling mountable light fixture with an extensible and retractable electrical outlet consistent with certain embodiments of the present invention with the retraction mechanism situated above the ceiling, and showing an electrical outlet assembly in a partially extended position.

FIG. 16 is a view of another embodiment of a ceiling mountable light fixture with an extensible and retractable electrical outlet consistent with certain embodiments of the present invention with the retraction mechanism situated above the ceiling 204, and showing an electrical outlet assembly in a partially extended position. This embodiment is similar to that of FIG. 1 except that it illustrates that the retraction mechanism 20 is not directly connected to the body member segment 14. In this instance, body member segment is illustrated as connected to a mounting arrangement shown schematically as the box (e.g., an electrical box) 208 shown in broken lines. This box 208 can be any suitable mounting arrangement for supporting the lighting fixture to the ceiling 204 or thereabouts. The retraction mechanism 20 is situated above the ceiling 204 and mounted in any suitable manner so as to permit the cable 18 to be dispensed from and retract back into the retraction mechanism. In this embodiment, separate wiring (not shown to avoid cluttering the illustration) may be provided to the lighting portion of the fixture. Hence, the present configuration hides the retraction mechanism from view by placing the retraction mechanism 20 above the lower surface of the ceiling 204. In accordance with embodiments consistent with the present invention, the retraction mechanism can be situated in any suitable location to permit retraction and dispensing the cable to the electrical fixture without limitation. Moreover, each of the variations discussed above can be intermingled, mixed and matched for any given situation without departing from embodiments consistent with the present invention.

Thus, an electrical fixture consistent with certain embodiments has a light fixture including an array of light sources and a mount used to attach the light fixture to a ceiling. A ground fault interrupter circuit is connected to a source of line voltage. An electrical outlet is electrically connected to the source of line voltage through the ground fault interrupter circuit by an electrical cable. A breakaway mechanism is provided that permits the cable to separate in the event excess tension is applied to the cable. A retraction mechanism is operatively coupled to dispense and retract the electrical cable, so that the electrical outlet can be moved between a retracted position adjacent the light fixture with the electrical cable fully retracted and at least one extended position wherein at least a portion of the electrical cable is dispensed from the retraction mechanism. A handle is coupled to the electrical outlet to facilitate grasping the electrical outlet to retract or dispense the electrical outlet. In embodiments consistent with the present invention, the retraction mechanism may be situated above or below the lower surface of the ceiling.

In preferred embodiments, the electrical fixtures have a GFCI protected retractable outlet. The fixture provides suitable task lighting in all phases of use. However, the drop-down outlet enables patrons to safely plug in their DC adaptors for personal computers or cell phones or the like while seated at the table. When finished, a simple tug and release mechanism allows the outlet to re-join the fixture above the table, allowing unobstructed use. This also provides patrons of the establishment with more comfort and convenience, thus motivating their return to make further purchases. Since their battery life is extended on visits to the establishment, patrons may stay at the establishment longer and purchase more.

Those skilled in the art will appreciate, upon consideration of the above teachings, that embodiments consistent with the present invention can be realized in many variations. For example, standard household electrical voltage rated light fixtures can be used, as well as high intensity LEDs, halogen sources, low voltage light fixtures, low temperature lights, high intensity lights, fluorescent lights or any other electrically generated source of light can suitably be substituted for the exemplary lights shown. Similarly, many variations in the retraction mechanism are possible, including but not limited to, reel type retraction mechanisms, spring driven mechanisms, automatically locking retraction mechanisms, manually locking retraction mechanisms, motor driven retraction and extension mechanisms, manually operated reels, ratcheting mechanisms or, in short, any mechanism that dispenses and retracts a length of electrical cable under user control, without limitation.

While the example embodiments have shown two incandescent lamps, one, three, four or more or any number in an array of light sources can equally well be used. The handle configurations shown should also not be considered limiting since any convenient arrangement that permits a user to grasp the outlet carrying portion of the structure is suitable—whether or not a separate handle structure, per se, is incorporated in the embodiment. Additionally, any suitable mechanism, fixed or movable, known or devised can be used to affix the electrical fixture to a ceiling including screw connections, pins, brackets, clamping arrangements, hooks, bolts or any other mechanism that is suitable to the type of ceiling to which the fixture is attached can be used without limitation. Moreover, any suitable breakaway cable structure can be utilized without limitation.

While certain illustrative embodiments have been described, it is evident that many alternatives, modifications, permutations and variations will become apparent to those skilled in the art in light of the foregoing description.

What is claimed is:

1. An electrical fixture, comprising:
a light fixture;
mounting means for mounting the light fixture to a ceiling;
an electrical outlet electrically connected to a source of line voltage by an electrical cable; and
dispensing and retracting means for dispensing and retracting the electrical cable, so that the electrical outlet can be moved between a retracted position adjacent the light fixture with the electrical cable fully retracted and at least one extended position wherein at least a portion of the electrical cable is dispensed from the dispensing and retracting means.

2. The electrical fixture according to claim 1, further comprising a ground fault interrupter circuit, and wherein the electrical outlet is electrically connected to the source of line voltage through the ground fault interrupter circuit.

3. The electrical fixture according to claim 2, further comprising a housing coupled to the mounting means, and wherein the ground fault interrupter circuit resides in the housing.

4. The electrical fixture according to claim 1, wherein the light fixture includes an array of light sources, and wherein the light sources comprise at least one of an incandescent light source, a low temperature light source a fluorescent light source, an LED light source, a low voltage light source, a halogen light source and a high intensity light source.

5. The electrical fixture according to claim 1, further comprising handle means coupled to the electrical outlet for facilitating grasping the electrical outlet to retract or dispense the electrical outlet.

6. The electrical fixture according to claim 1, further comprising at least one of a surge arrester, an uninterruptible power source, and a circuit breaker connected to the electrical outlet.

7. The electrical fixture according to claim 6, further comprising a housing coupled to the light fixture, and wherein the at least one of the surge arrester, uninterruptible power source and the circuit breaker is situated in the housing.

8. The electrical fixture according to claim 1, further comprising:
a housing coupled to the light fixture;
a low voltage lighting source providing light from the lighting fixture; and
a transformer that steps the line voltage down to a voltage appropriate to the low voltage lighting source, and wherein the transformer is situated within the housing.

9. The electrical fixture according to claim 1, further comprising:
a housing coupled to the light fixture;
a light emitting diode (LED) lighting source providing light from the lighting fixture; and
a controller circuit that controls the signal to the LED lighting source situated within the housing.

10. The electrical fixture according to claim 1, further comprising a breakaway mechanism that permits the cable to separate in the event excess tension is applied to the cable.

11. The electrical fixture according to claim 1, wherein the dispensing and retracting means is situated above the ceiling.

12. The electrical fixture according to claim 5, further comprising an advertisement coupled to the handle means.

13. An electrical fixture, comprising:
a light fixture;
a mount used to attach the light fixture to a ceiling;
an electrical outlet electrically connected to a source of line voltage by an electrical cable; and
a retraction mechanism, that dispenses and retracts the electrical cable, so that the electrical outlet can be moved between a retracted position adjacent the light fixture with the electrical cable fully retracted and at least one extended position wherein at least a portion of the electrical cable is dispensed from the retraction mechanism.

14. The electrical fixture according to claim 13, further comprising a ground fault interrupter circuit, and wherein the electrical outlet is electrically connected to the source of line voltage through the ground fault interrupter circuit.

15. The electrical fixture according to claim 14, further comprising a housing coupled to the light fixture, and wherein the ground fault interrupter circuit resides in the housing.

16. The electrical fixture according to claim 13, wherein the light fixture includes an array of light sources, and wherein the light sources comprise at least one of an incandescent light source, a low temperature light source, a fluorescent light source, an LED light source, a low voltage light source, a halogen light source and a high intensity light source.

17. The electrical fixture according to claim 13, further comprising a handle coupled to the electrical outlet to facilitate grasping the electrical outlet to retract or dispense the electrical outlet.

18. The electrical fixture according to claim 17, further comprising an advertisement coupled to the handle.

19. The electrical fixture according to claim 13, further comprising at least one of a surge arrester, an uninterruptible power source, and a circuit breaker connected to the electrical outlet.

20. The electrical fixture according to claim 19, further comprising a housing coupled to the light fixture, and wherein the at least one of the circuit breaker, uninterruptible power source and surge arrester is situated in the housing.

21. The electrical fixture according to claim 13, further comprising:
a housing coupled to the light fixture;
a low voltage lighting source providing light from the lighting fixture; and
a transformer that steps the line voltage down to a voltage appropriate to the low voltage lighting source, and wherein the transformer is situated within the housing.

22. The electrical fixture according to claim 13, further comprising:
a housing coupled to the light fixture;
a light emitting diode (LED) lighting source providing light from the lighting fixture; and
a controller circuit that controls the signal to the LED lighting source situated within the housing.

23. The electrical fixture according to claim 13, further comprising a breakaway mechanism that permits the cable to separate in the event excess tension is applied to the cable.

24. The electrical fixture according to claim 13, wherein the dispensing and retracting means is situated above the ceiling.

25. An electrical fixture, comprising:
a light fixture including an array of light sources;
a mount used to attach the light fixture to a ceiling;
a ground fault interrupter circuit connected to a source of line voltage;

an electrical outlet electrically connected to the source of line voltage through the ground fault interrupter circuit by an electrical cable;

a retraction mechanism that dispenses and retracts the electrical cable, so that the electrical outlet can be moved between a retracted position adjacent the light fixture with the electrical cable fully retracted and at least one extended position wherein at least a portion of the electrical cable is dispensed from the retraction mechanism;

a breakaway mechanism that permits the cable to separate in the event excess tension is applied to the cable; and a handle coupled to the electrical outlet to facilitate grasping the electrical outlet to retract or dispense the electrical outlet.

26. The electrical fixture according to claim 25, further comprising a housing coupled to the light fixture, and wherein the ground fault interrupter circuit resides in the housing.

27. The electrical fixture according to claim 25, wherein the light fixture includes an array of light sources, and wherein the light sources comprise at least one of an incandescent light source, a low temperature light source, a fluorescent light source, an LED light source, a low voltage light source, a halogen light source and a high intensity light source.

28. The electrical fixture according to claim 25, further comprising at least one of a surge arrester, an uninterruptible power source, and a circuit breaker connected to the electrical outlet.

29. The electrical fixture according to claim 25, further comprising an advertisement coupled to the handle.

* * * * *